US006902697B2

(12) United States Patent
Ohsono et al.

(10) Patent No.: US 6,902,697 B2
(45) Date of Patent: Jun. 7, 2005

(54) METHOD OF MANUFACTURING A RADIOACTIVE-SUBSTANCE STORAGE MEMBER, BILLET FOR USE IN EXTRUSION OF THE SAME, AND SQUARE PIPE

(75) Inventors: Katsunari Ohsono, Hyogo (JP); Kazuo Murakami, Hyogo (JP); Yasuhiro Sakaguchi, Hyogo (JP); Toshiro Kobayashi, Hiroshima (JP); Toyoaki Yasui, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 165 days.

(21) Appl. No.: 10/125,372

(22) Filed: Apr. 19, 2002

(65) Prior Publication Data
US 2002/0152841 A1 Oct. 24, 2002

(30) Foreign Application Priority Data
Apr. 19, 2001 (JP) ........................................ 2001-121799

(51) Int. Cl.[7] .................................................. B22F 3/00
(52) U.S. Cl. ............................ 419/10; 419/28; 419/29; 419/32; 419/38; 376/272
(58) Field of Search ............................... 419/10, 28, 29, 419/32, 38, 12, 56, 60; 376/272; 250/506.1

(56) References Cited

U.S. PATENT DOCUMENTS

| 4,557,893 A | 12/1985 | Jatkar et al. .................. 419/12 |
| 5,403,540 A | * 4/1995 | Brundage et al. .............. 419/2 |
| 5,561,829 A | * 10/1996 | Sawtell et al. ................. 419/13 |
| 5,681,783 A | * 10/1997 | Nilsson et al. ................. 501/87 |
| 5,700,962 A | 12/1997 | Carden ........................ 75/236 |

FOREIGN PATENT DOCUMENTS

| CH | 410 436 | 3/1966 |
| DE | 43 08 612 | 9/1994 |
| EP | 0 087 926 | 9/1983 |
| EP | 1 083 240 | 3/2001 |
| EP | 1 172 449 | 1/2002 |
| JP | 6-122933 | 5/1994 |
| JP | 9-324228 | 12/1997 |
| JP | 10-232294 | 9/1998 |
| JP | 2000-135543 | 5/2000 |
| JP | 2000-514552 | 10/2000 |
| JP | 2001-42089 | 2/2001 |
| JP | 2001-42090 | 2/2001 |
| JP | 2001-116884 | 4/2001 |
| WO | WO 98/00258 | 1/1998 |
| WO | WO 01/09903 | 2/2001 |

OTHER PUBLICATIONS

S. Tsuchida, Keikinzoku, The Japan Institute of Light Metals, vol. 36, No. 10, pp. 656–663, "Degassing and Consolidation in Aluminum Powder Metallurgy", 1987.

* cited by examiner

Primary Examiner—Ngoclan T. Mai
(74) Attorney, Agent, or Firm—Oblon, Spivak, McClelland, Maier & Neustadt, P.C.

(57) ABSTRACT

An aluminum powder is mixed with a neutron absorber powder through cold isostatic press to form a preliminary molding. The preliminary molding is then subjected to sintering under no pressure in vacuum. After sintering, a billet is subjected to induction heating and hot extrusion to form a square pipe.

14 Claims, 10 Drawing Sheets

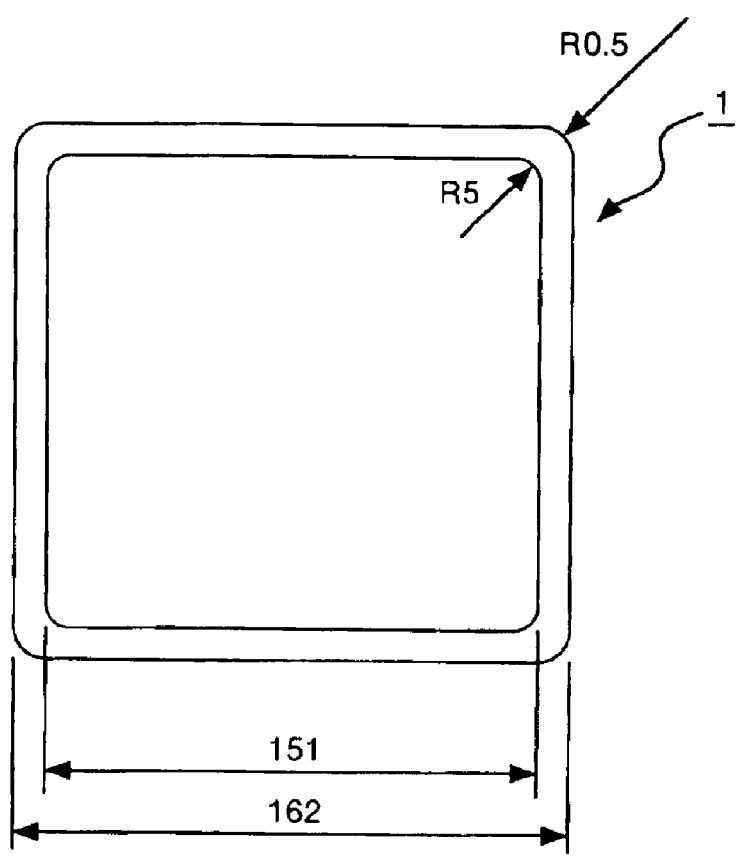

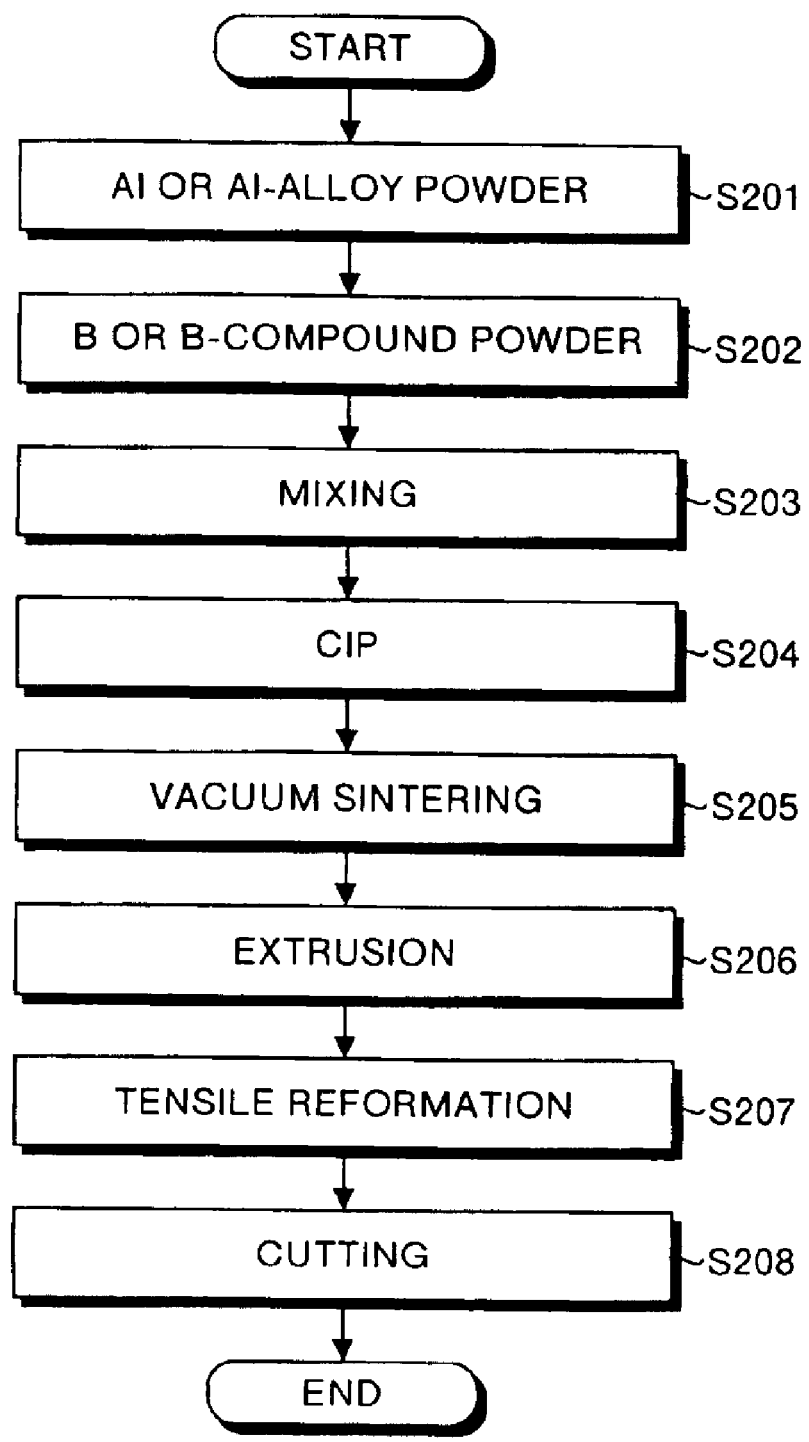

A—A

METHOD OF MANUFACTURING A RADIOACTIVE-SUBSTANCE STORAGE MEMBER, BILLET FOR USE IN EXTRUSION OF THE SAME, AND SQUARE PIPE

FIELD OF THE INVENTION

The present invention relates to a method of manufacturing a radioactive-substance storage member that is employed to configure a cask or rack which accommodates and storing an aggregate of spent nuclear fuel coming to an end of burn-up, and a billet for use in extrusion of the member. It also relates to a square pipe which accommodates an aggregate of spent fuel.

BACKGROUND OF THE INVENTION

An aggregate of useless nuclear fuel coming to an end of burn-up at the termination of a nuclear fuel cycle is called the spent nuclear fuel. Currently, the spent nuclear fuel is stored and managed in a storage facility until it is reprocessed. For example, in a storage system of fuel pool type, a SUS rack including bundles of square pipes is sunken in a pool, and the aggregate of spent nuclear fuel is accommodated in the square pipes to satisfy the needs for cooling effect, shielding effect and non-criticality.

In recent years, a start has made at employing a boron-doped stainless material for square pipes to configure a rack. The use of such the square pipes can omit a neutron absorber material disposed between the square pipes to eliminate a gap between the square pipes. Therefore, it is possible to increase the number of square pipes that can be inserted in a pit in the pool and accordingly increase the number of the aggregates of the spent nuclear fuel to be accommodated.

The above square pipes can be applied to various storage systems including types of cask, lateral silo, pool and bold. It is required to produce a large number of square pipes to configure even a rack, and accordingly a technology capable of producing square pipes efficiently is required. It is also required to absorb neutrons radiated from the aggregate of spent nuclear fuel. Therefore, the square pipes are required to have soundness in their structures.

The square pipes are employed for storing the aggregate of spent nuclear fuel. Other than the rack of square pipe type, a flat plate type is also known, which requires efficiency in the production and soundness in the structure. The present invention relates to a method of manufacturing such square pipes, for example.

SUMMARY OF THE INVENTION

The method of manufacturing a radioactive-substance storage member according to one aspect of the present invention comprises mixing an aluminum powder with a neutron absorber powder, pressing the mixed powder to form a preliminary molding, and sintering the preliminary molding under no pressure in vacuum.

The method of manufacturing a radioactive-substance storage member according to another aspect of the present invention comprises mixing an aluminum powder with a neutron absorber powder, pressing the mixed powder to form a preliminary molding, sintering the preliminary molding under no pressure in vacuum to form a billet, heating the billet using an induction heating unit, and extruding the induction-heated billet using dies to form a square pipe or plate which configures a basket for accommodating an aggregate of spent fuel or a rod to be inserted in a guide pipe for spent fuel.

The method of manufacturing a radioactive-substance storage member according to still another aspect of the present invention comprises mixing an aluminum powder with a neutron absorber powder, pressing the mixed powder to form a preliminary molding, sintering the preliminary molding under no pressure in vacuum to form a billet, and extruding the billet using the heat during the sintering to form a square pipe or plate which configures a basket for accommodating an aggregate of spent fuel or a rod to be inserted in a guide pipe for spent fuel.

The method of manufacturing a radioactive-substance storage member according to still another aspect of the present invention comprises mixing an aluminum powder with a neutron absorber powder, pressing the mixed powder to form a preliminary molding, and sintering the preliminary molding under no pressure in an inert gas ambience.

The method of manufacturing a radioactive-substance storage member according to still another aspect of the present invention comprises mixing an aluminum powder with a neutron absorber powder, pressing the mixed powder to form a preliminary molding, sintering the preliminary molding under no pressure in an inert gas ambience to form a billet, heating the billet using an induction heating unit, and extruding the induction-heated billet using dies to form a square pipe or plate which configures a basket for accommodating an aggregate of spent fuel or a rod to be inserted in a guide pipe for spent fuel.

The method of manufacturing a radioactive-substance storage member according to still another aspect of the present invention comprises mixing an aluminum powder with a neutron absorber powder, pressing the mixed powder to form a preliminary molding, sintering the preliminary molding under no pressure in an inert gas ambience to form a billet, extruding the billet using the heat during the sintering to form a square pipe or plate which configures a basket for accommodating an aggregate of spent fuel or a rod to be inserted in a guide pipe for spent fuel.

The billet according to still another aspect of the present invention comprises a mixed powder of an aluminum powder and a neutron absorber powder, the mixed powder molded to have a weight density ranging from 75% to 95% and sintered to fuse each powdery particle to another.

The billet according to still another aspect of the present invention comprises a mixed powder of an aluminum powder flattened by mechanical alloying and a pulverized boron or boron-compound folded and dispersed into the aluminum powder, the mixed powder molded to have a weight density ranging from 75% to 95% and sintered to fuse each powdery particle to another.

In the billet according to still another aspect of the present invention, the billet is employed as a structural material of storage or transportation containers for spent nuclear fuel, the aluminum powder containing an additional element such as Zr for imparting high strength.

In the square pipe according to still another aspect of the present invention comprises, the square pipe is formed by mixing an aluminum powder with a neutron absorber powder through cold isostatic press or cold unidirectional press to form a preliminary molding, vacuum sintering the preliminary molding under no pressure to form a billet, and heating the billet using an induction heating unit to extrude the square pipe.

The method of manufacturing a radioactive-substance storage member according to still another aspect of the present invention comprises mixing an aluminum powder with a neutron absorber powder, pressing the mixed powder to form a preliminary molding, sintering the preliminary molding with a vacuum hot press to form a billet, heating the billet using an induction heating unit, and extruding the induction-heated billet using dies to form a square pipe or plate which configures a basket for accommodating an aggregate of spent fuel or a rod to be inserted in a guide pipe for spent fuel.

Other objects and features of this invention will become apparent from the following description with reference to the accompanying drawings.

BRIEF DESCRIPTION OF THE DRAWINGS

FIG. 1 is a cross-sectional view which shows a square pipe,

FIG. 2 is a flowchart which shows a method of manufacturing a square pipe according to Embodiment 1 of the present invention.

DETAILED DESCRIPTIONS

Figure 3A:
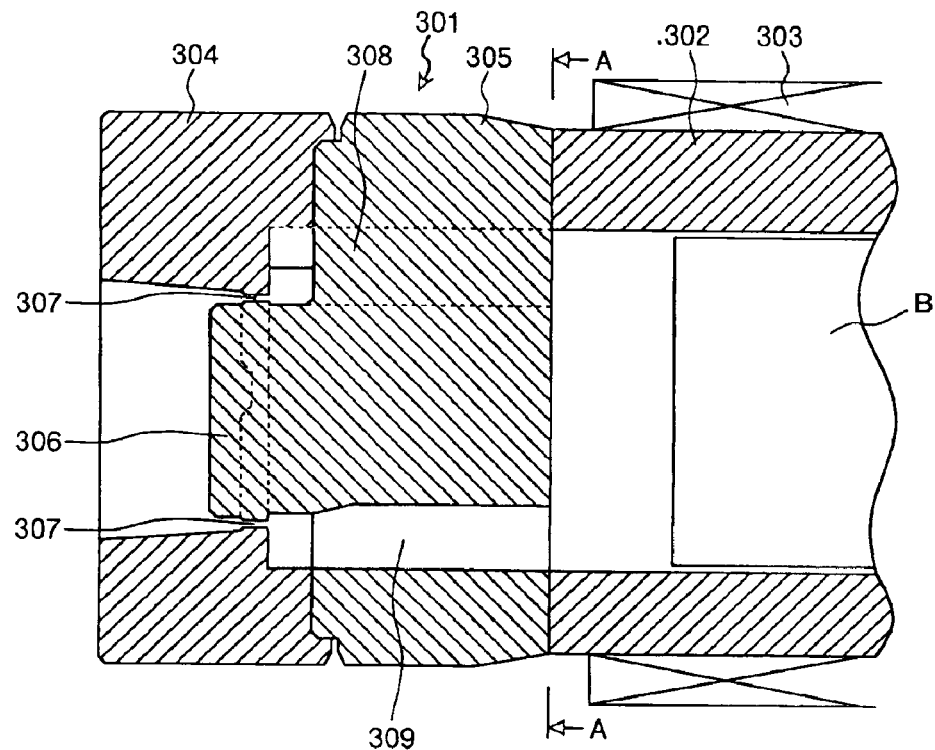
FIG. 3 shows a configuration of dies in a porthole extruder in an axial cross-sectional view (a) and a radial cross-sectional view (b)

Embodiments of methods of manufacturing a radioactive-substance storage member and billets for use in extrusion of the member according to the present invention will be described below with respect to embodiments in detail with reference to the drawings. These embodiments are, however, not intended to limit the scope of the invention.

A first embodiment will be explained below. FIG. 1 shows a square pipe in a cross-sectional view. This square pipe 1 has a square section and is composed of an aluminum complex or an aluminum alloy including an Al or Al-alloy powder, to which a B or B-compound powder having a neutron absorbing power is added. Available neutron absorbers other than boron include cadmium, hafnium and rare earth elements that have large cross-sectional areas for neutron absorption. The B or B-compound is mainly employed in the case of a boiling water reactor (BWR), while an alloy of Ag—In—Cd is employed in the case of a press water reactor (PWR). If B is employed as a dispersive medium, 7 wt. % or less is preferable for easy processing. A composition of the Ag—In—Cd alloy contains 15 wt. % of In and 5 wt. % of Cd in general. Available rare earth elements include europium, dysprosium, samarium and gadolinium in their oxidized form.

An example of a method of manufacturing the square pipe 1 is described next specifically. FIG. 2 is a flowchart which shows a method of manufacturing a square pipe according to Embodiment 1 of the present invention. A rapid solidification processing such as an atomization method is employed to produce an Al or Al-alloy powder (Step S201) and prepare a B or B-compound powder (Step S202). These powders are mixed for 10 to 20 minutes in a cross rotary mixer, a V-mixer, a ribbon mixer or a pug mixer (Step S203). This mixing may be performed in an argon ambient. The aluminum powder used has an average particle diameter of about 35 $\mu$m and $B_4C$ an average particle diameter of about 10 $\mu$m.

The Al or Al-alloy powder available as a base can be selected among pure aluminum metals (JIS 1xxx series), Al—Cu series aluminum alloys (JIS 2xxx series), Al—Mg series aluminum alloys (JIS 5xxx series), Al—Mg—Si series aluminum alloys (JIS 6xxx series), Al—Zn—Mg series aluminum alloys (JIS 7xxx series), and Al—Fe series aluminum alloys (1 to 10% by weight of Fe content) as well as Al—Mn series aluminum alloys (JIS 3xxx series). These can be selectively employed in accordance with necessary properties such as strength, stretchability, processability and heat resistance without particular limitations.

$B_4C$ and $B_2O_3$ can be employed as the above B or B-compound. Preferably, an amount of boron added to aluminum is more than 1.5 wt. % but less than 9 wt. %. An additional amount below 1.5 wt. % cannot achieve a sufficient neutron absorbing power and an additional amount above 9 wt. % lowers a stretch against tensile.

Preferably, the mixed powder is contained and sealed within a rubber case, then high pressure is applied uniformly from all directions at normal temperature using CIP (Cold Isostatic Press) to mold the powder (Step S204) A molding condition for CIP includes a molding pressure of 1000 to 2000 $kg/cm^2$. The CIP process allows a powdery body to lose its volume by about 20% and the preliminary molding to have a diameter of 600 mm and a length of 1500 mm. The uniform pressurization from all directions by CIP allows high dense moldings to be obtained with less variation in molding densities. In the CIP process the preliminary molding is managed to have a weight density of 75 to 95%.

As a preferred pressurization technology, instead of the above CIP, a unidirectional high-pressure press can be employed to form a preliminary molding. Specifically, the mixed powder is led into a mold that is set in a press machine to form a preliminary molding under a high molding pressure of from 5000 tons to 10000 tons. The use of such the extremely high-pressure for press is effective to achieve uniform molding densities in the preliminary molding. Preferably, the extent of the uniformity of molding densities is substantially equal to that obtained in the above CIP process. In this case, a target molding density may be employed as the reference to determine the molding pressure. The mixed powder is not required to be contained in a rubber case, which is vaccumized, but in a mold to be pressed. Therefore, a relatively easy preliminary molding operation can be performed compared to CIP. The methods of producing preliminary moldings are not limited in the CIP and the unidirectional press.

The preliminary molding is led into a sintering furnace and sintered under no pressure after the furnace is vaccumized (Step S205). During the vacuum sintering, a vacuum is kept about $10^{-1}$ Torr and a temperature set at 550 to 600° C. A time period for retaining the sintering temperature can be appropriately set between 5 hours and 10 hours. The sintering temperature is elevated step by step at a pitch of 100° C. A graphite heater provided in the sintering furnace is employed for heating. The vacuum sintering can fuse temporally fixed powdery particles with each other to form a neck, which turns into a billet for use in extrusion.

Instead of vacuumizing the sintering furnace, an inert gas such as an argon gas and a helium gas may be filled for sintering under on pressure. The conditions including the sintering temperature and time are similar to those described above.

During the sintering, as any pressurization technology such as HIP and hot press is not employed in the above method, the sintered body has a weight density rarely varied from that at the time of preliminary molding, maintaining 75 to 95%. The vacuum sintering can prevent billets from oxidizing and omit canning. Therefore, it is possible to save spending on cans, eliminate the need for steps of cutting the outer and end surfaces to remove the cans, and additionally omit the accompanying process steps of canning and so forth.

Figure 3B:
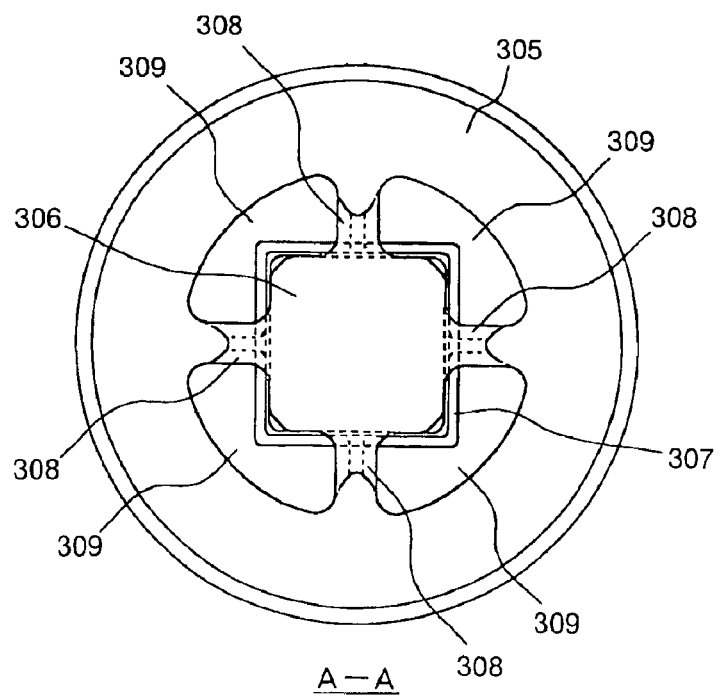

A porthole extruder is employed to hot extrude the billet (Step S206). The extrusion condition in this case includes a heating temperature of 500 to 520° C. and an extrusion speed of 5 m/min. This condition can be changed appropriately in accordance with the content of B. The porthole extruder has an extrusion force of 5000 to 6000 tons. FIG. 3 shows a configuration of dies in the porthole extruder in an axial cross-sectional view (a) and a radial cross-sectional view (b). This porthole extruder 300 comprises dies 301 and a container 302. A RF coil 303 is located around the container 302 for induction heating. When a RF current flows into the RF coil 303, a billet B in the dies 301 can be inductively heated. The dies 301 include a female type 304 and a male type 305. A mandrel 306 of the male die 305 is inserted into the female die 304 to shape a bearing 307 in the extruded form of a square. The mandrel 306 is supported by four bridges 308 extending from the periphery of the male die 305 to form four ports 309 among the bridges 308.

The induction heating generates an induced current in the billet B to heat it. A heating target or the billet B is in a state of the mixed powder fused in the step of vacuum sintering. Accordingly, the induced current can be generated over the whole billet B for efficient heating. Two preliminary moldings were produced by CIP as practical samples with a weight of 2510 g, $\phi$-size of 89 mm×175 mm, volume of 1100 mm$^3$ and relative density of 85%. Both were compared with each other after only one of them was sintered in vacuum. As a result of the comparison, the sample compacted only by CIP has an electric conductivity of 7% while the vacuum-sintered sample exhibits that of 37%, which is more than five times the former.

When the samples were inductively heated, the vacuum-sintered sample exhibited a temperature elevation as the temperature elevation program for induction heating defines (to elevate a temperature up to 520° C. at 200° C./min and then retain it for a certain time period). It was found that less variation was present in the sample at the edges and the surface and internal center of the mid-portion, and that temperatures were elevated almost uniformly at any locations. On the other hand, the sample compacted only by CIP could not allow a temperature to elevate as the temperature elevation program, resulting in a temperature elevation rate of 50° C./min at most. This demonstrates that improvement of the electric conductivity is associated with the time period for induction heating during extrusion, and that the application of vacuum sintering as is in the present invention allows the temperature elevation to follow the temperature elevation program. It can be finally concluded that the vacuum sintering extremely increases the efficiency of the induction heating and improves the extrusion speed of the billet advantageously.

The billet B inductively heated in the container is then pushed from behind by a punch and split into four at the bridges 308 to pass through the ports 309. Consequently, they are integrated together during passage from the ports 309 to the bearings 307, which extrude the square pipe 1 in the form of a certain extrusion shape. The weight density of the billet B is 75 to 95% while that of the square pipe 1 becomes almost 100% because air gaps between the powdery particles are crushed at the time of extrusion.

After the extrusion, tensile reformation is performed (Step S207) and unsteady parts and evaluation parts are cut away to complete products (Step S208). The completed square pipe 1 has a square shape in section with an outer side of 162 mm and an inner side of 151 mm as shown in FIG. 1. The above process steps are effective when the steps of billet molding and extrusion are performed at different places or different timings.

If the steps of vacuum sintering and extrusion are performed closely in time, as is in a process line including a vacuum sintering line and an extrusion line successively, a temperature is elevated up to 550 to 600° C. during vacuum sintering. Therefore, after completion of the sintering, the billet may be inserted into the container and extruded directly within a thermal region at least 500° C. that is the extrusion temperature. Specifically, the billet is removed out of the vacuum furnace and, before the temperature of the billet lowers, conveyed to the extruder, which extrudes the square pipe 1. If the heated billet is exposed to the atmosphere but only for a short time, the oxidization effect can be almost neglected and the performance of the square pipe 1 is hardly affected. Preferably, the billet is extruded within 15 minutes after removed from the vacuum furnace. In this case, the oxidization effect is rarely problematic. As obvious from the above procedures, the induction heating eliminates the need for re-heating of the billet and further simplifies the process steps.

Also in this case, the vacuum sintering can prevent billets from oxidizing and omit canning. Therefore, it is possible to save spending on cans, eliminate the need for steps of cutting to remove the cans, and additionally omit the accompanying process steps of canning and so forth. Temporally stored for a short time in a heat-insulated chamber that can keep the temperature during vacuum sintering, the billet may be transferred into the container in the extruder within a thermal region more than 500° C. In this case, the vacuum sintering line is not required to follow the extrusion line and both may be spaced apart from each other without any problems. If a distance between the vacuum sintering line and the extrusion line is small and a time required for conveying the billet is short, the heat from vacuum heating can be employed for the extrusion similar to the above, needless to say. Further, hot working such as forging may be carried out before the extrusion, in order to increase a sintered density of the billet.

The extruder employed in the above example is of the porthole type because it has a high compressibility and is suitable for extruding a complicated shape composed of a soft material such as aluminum. Though, the extruder is not limited in this type. For example, a stationary or movable mandrel type may also be employed. Besides the direct extrusion, isostatic press extrusion maybe applied. These can be selected appropriately within a possible range that an ordinary skilled person in the art can consider. Even though a batch process has a relatively low yield, it maybe applied to batch billets in the heating furnace instead of the induction heating.

A second embodiment will be explained below. In this embodiment, boron-doped aluminum alloy is employed as the material to construct the square pipe 1 in the above. If the doped element, B4C, has a large average particle diameter, it reduces the strength of the square pipe 1. In contrast, If B4C has a small average particle diameter, B4C particles aggregate together and precipitate, resulting in a lowered neutron absorbing power and a worsened processability. As described above, the average particle diameter is determined 80 μm for the Al powder and 9 μm for the B4C powder. The reason for the determination of 9 μm for the particle diameter of the B4C is that a smaller particle diameter than that promotes the aggregation of the B4C powder and causes the precipitation easily. In this Embodiment 2, instead of the mixer in the Embodiment 1, high-energy ball milling (mechanical alloying) is employed to achieve a fine and uniformly dispersed B4C powder.

Figure 4:
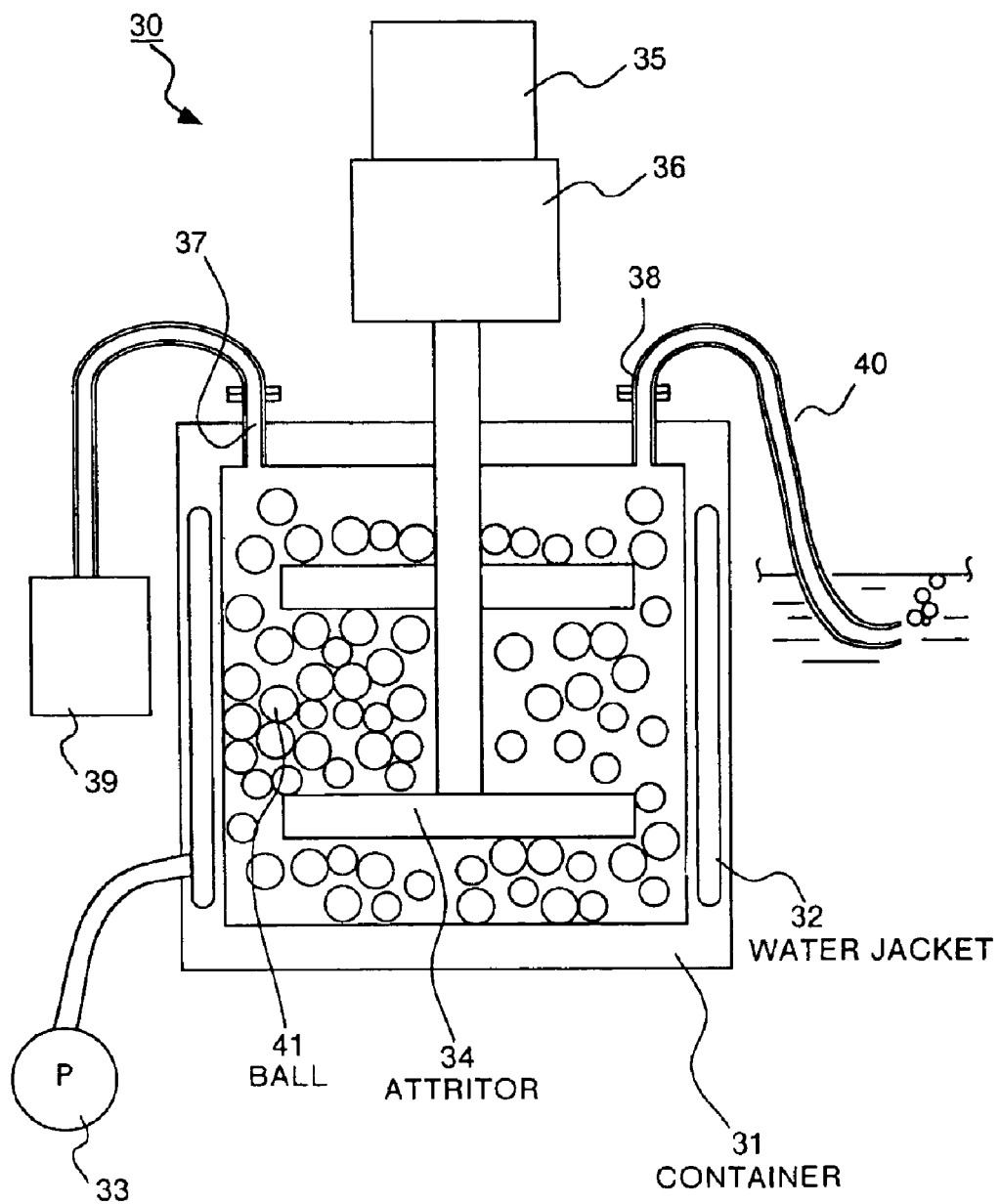
FIG. 4 shows an outlined configuration of a powder manufacturing apparatus which performs a manufacturing method according to Embodiment 2 of the present invention.

In the high-energy ball milling, a tumbling mill, a rocking mill and an attritor mill can be employed in general. The attritor mill is exemplified below. FIG. 4 shows a configuration of the attritor mill for use in a method of manufacturing a square pipe according to Embodiment 2. The attritor mill 30 comprises a container 31 with a volume of 150 liters. A water jacket 32 is formed inside the wall plate of the container 31. A water supplier 33 such as a pump is employed to supply an appropriate amount of cooling water into the water jacket 32. An attritor 34 is coupled via a decelerator 36 to a drive motor 35 located above. In the upper surface of the container 31, an inlet 37 and an outlet 38 are provided to create an ambient of an inert gas or argon (Ar) within the container 31. The inlet 37 is connected to a gas cylinder 39 of argon gas and the outlet 38 is connected to a hose 40, which is led into water to prevent reverse flow of the atmosphere. Carbon-steel-based bearing steel (SUJ-2) or a ceramic ball is employed for a ball 41 for use in this ball milling.

A condition was determined for producing a high-energy powder in practice such that an amount of the balls 41 to be contained in the container 31 is equal to 450 kg and a diameter of the ball 41 equal to ⅜ inch. The number of revolutions of the attritor 34 is determined 300 rpm and argon is continuously flowed at 0.5 liter/min into the container 31 to create an inert gas ambience inside. Prior to the ball milling, 10 to 50 cc of ethanol or methanol relative to 1 kg of powder is deposited as an auxiliary agent. An amount of powder to be deposited in the container 31 is determined 15 kg, which includes 0.75 kg of B4C (5% by weight) In practical use, Al powder has an average particle diameter of 35 μm and B4C powder an average particle diameter of 9 μm. A time for ball milling can be selected appropriately from a range between 1 hr and 10 hrs.

In the process of ball milling, the deposited aluminum suffers impacts from the balls 41 and is crushed, folded and flattened. As a result, an outer diameter of the aluminum is widened in plane to about 80 μm. In contrast, the B4C powder is pulverized during ball milling, down-sized to have a particle diameter of 0.5 to 1.0 μm and uniformly mixed into the aluminum matrix.

In the process of ball milling, the balls 41 collide with each other and the components wore of the balls 41 may often be mixed as impurities. Accordingly, if an element to be added as an impurity is previously contained in the ball 41 as a component, the element can be added in the process of ball milling. An example of such the element is zirconia, alumina, or the like. After the termination of ball milling, the high-energy powder is removed from the container 31 and subjected to the hot press step and then the extrusion step to form the square pipe 1 as shown in FIG. 1.

According to the method of manufacturing the square pipe 1, the fine and uniform B4C powder can be dispersed in the matrix of Al powder, resulting in an improved strength imparted to the square pipe 1. Specifically, in comparison with the square pipe 1 obtained by the method of Embodiment 1, the strength can be improved up to about 1.2 to 1.5 times. In particular, it is useful as a square pipe for a cask in PWR that has a large weight of the aggregate of spent fuel. The fine and uniform dispersion of the highly hard B4C powder in the matrix can prevent aggregation of the B4C powder and improve the extrusion ability. It is also effective to reduce wear of the dies for extrusion.

During ball milling, an organic solvent such as an alcohol may be deposited to produce a compound of the organic solvent and aluminum, which is added effectively to improve the strength and stretchability of the square pipe 1.

Figure 5:
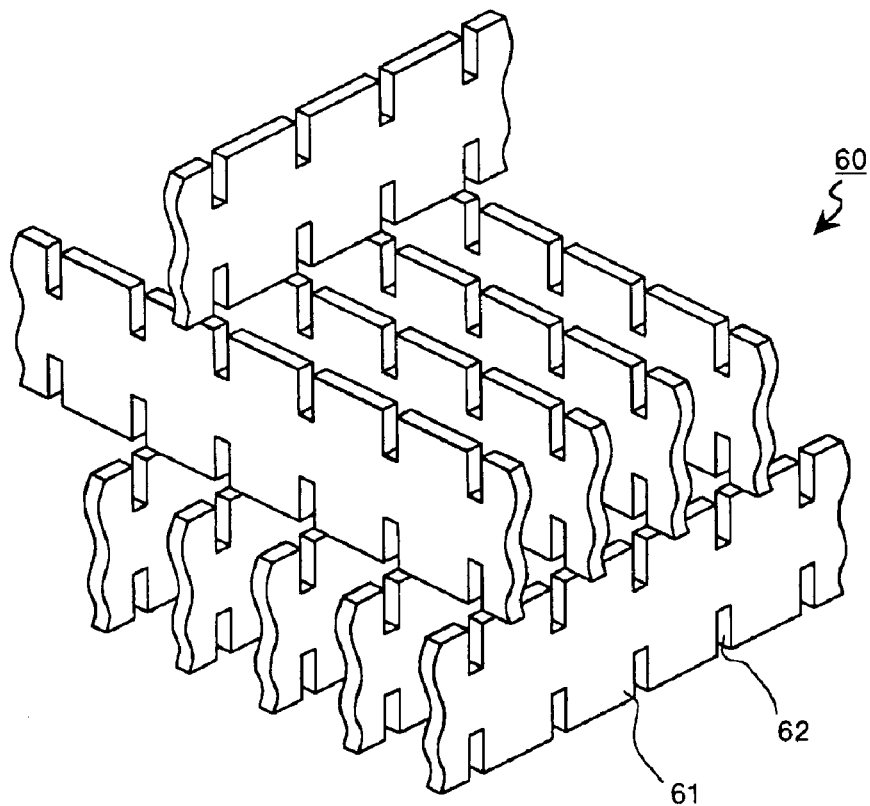
FIG. 5 is a perspective view which shows a rack of flat plate type.

A third embodiment will be explained below. In this embodiment, a rack for accommodating the aggregate of spent fuel may be of a flat plate type instead of the square pipe type. FIG. 5 shows a flat plate rack in a perspective view. This flat plate rack 60 employs the billets produced by the manufacturing method of Embodiment 1 or 2, which are extruded to form flat members 61 each having a width of 300 to 350 mm. Plural slits 62 are formed successively in each of the flat members 61. The flat members 61 are engaged with each other in the longitudinal and lateral directions at the slits 62 to form a grid-like cross section. As the flat plate rack 60 has a smaller plate thickness than that of the square pipe type, a larger amount of boron is dispersed in aluminum. The flat plate rack 60 can be employed as a cask and a rack for spent fuel pool.

The manufacturing method of the first or third embodiments can also produce a plate, not depicted, which can be employed not only in the flat plate rack 60 but also in a structural material for a transportation container for low level wastes.

Figure 6:
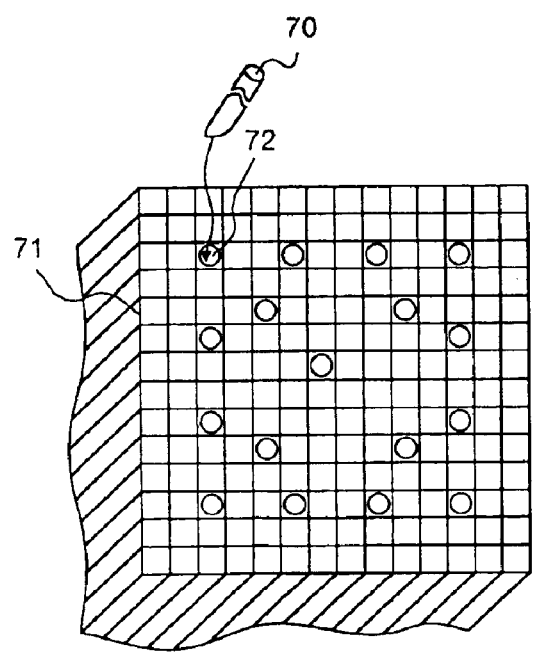
FIG. 6 shows an aggregate of spent fuel.

A fourth embodiment will be explained below. In the first and second embodiments, the dispersion of boron in the square pipe 1 imparts the neutron absorbing power and prevents the spent fuel aggregate from reaching the criticality. In the fourth embodiment, instead of the square pipe 1, a round rod is molded to absorb neutrons from the spent fuel aggregate. As show in FIG. 6, a round rod 70 is inserted into a guide tube 72 for a cluster of control rods (or a measurement tube) in a spent fuel aggregate 71. The insertion of the round rod 70 ensures a certain neutron absorbing power and eliminates the need for dispersion of a large amount of boron in the square pipe 1. The manufacturing method of Embodiment 1 or 2 can be employed in production of the round rod 70 because only shapes of dies in final extrusion steps differ from each other.

A fifth embodiment will be explained below. As the fifth embodiment, preferably, an additional element such as Zr and Ti is added in the aluminum powder to impart a high strength. The content of Zr in this case is determined more than 0.2 wt. % and less than 2.0 wt. %, more preferably more than 0.5 wt. % and less than 0.8 wt. %. The content of Ti is determined more than 0.2 wt. % and less than 4.0 wt. %. Both Zr and Ti can be added together. The addition of Zr or Ti improves mechanical properties such as a tensile property and achieves a high processability. Accordingly, this aluminum composite material can be employed as a structural material for use in a storage or transportation container for spent nuclear fuel and a structural member for nuclear-related facilities.

The following reason is given to the additional amount of Zr or Ti that should be kept within the range described above. In the case of Zr, the content below 0.2 wt. % reduces an effect of strength improvement and, in contrast, the content above 2.0 wt. % reduces stretchability and tenacity and saturates the effect of strength improvement. In the case of Ti, the content below 0.2 wt. % causes an insufficient effect of strength improvement and, the content above 4.0 wt. % makes it difficult to form a fine inter metallic compound and has a trend to easily reduce tenacity and saturate the effect of strength improvement. As for the Zr or Zr-compound, a sponge form one is employed, for example, as well as for the Ti or Ti-compound.

The moldings after the extrusion may be subjected to heating, if required. For example, if an Al-alloy powder in Al—Mg—Si series is employed as a base, T6 processing of JIS is performed. If an Al-alloy powder in Al—Cu series is employed as abase, T6 processing of JIS is also performed. If a powder of pure Al or of an Al-alloy in Al—Fe series is employed as a base, heating is not required. This case corresponds to T1 or H112 processing of JIS.

In particular, T1 or H112 processing is performed on the molding that contains the additional element for imparting the high strength to obtain a material suitable for a structural material for use in a storage or transportation container for the spent nuclear fuel. As a result, the material obtained is stabile at high temperature over a long period of time. In contrast, if artificial aging such as T6 processing is performed on the molding, decrease in strength due to over-aging may occur, and it becomes difficult to obtain the material that is resistant to high temperature over a long period of time.

The aluminum composite material according to this embodiment is suitable for a structural material of a container for use in storage or transportation of the spent nuclear fuel. The reason is given below. When the spent nuclear fuel is stored or transported, it is required to accommodate the spent nuclear fuel in a container that has a function of shielding radioactivity from the spent nuclear fuel. The container is assumed to fall to the ground in a storage facility during storage due to some causes or drop down from a carrier vehicle during transportation of the container. In these situations, if the structural material of the storage or transportation container is damaged, neutrons from the accommodated spent nuclear fuel can not be absorbed. This leads to a possibility to cause an accident, which can not be denied. Specifically, if a basket for a cask is constructed as disclosed below, the basket includes grid-like cells for accommodating the aggregates of the spent nuclear fuel inserted, which has a weight of 150 kg or more per aggregate in the case of BWR fuel. If these aggregates of the spent nuclear fuel are accommodated 50 or more, the dropping or falling of the cask imparts a considerably large impact on the basket. Therefore, the basket is required to have a mechanical property sufficiently durable against such the impact.

The basket is also required to have a power to absorb neutrons radiated from the spent nuclear fuel during accommodation of that spent nuclear fuel. A generally known neutron absorbing material includes B or B-compound, which is mixed in an aluminum matrix and employed as a neutron shielding material in common. If the aluminum material that contains such B or B-compound is employed to construct the basket for the cask, the basket itself is required to have both a neutron absorbing power and a mechanical strength as a structural material.

The storage period for the spent nuclear fuel accommodated in the container is as extremely long as about 60 years. A temperature elevates high (specifically, 150° C. or more) within the container for a long time due to the decay heat of the spent nuclear fuel and the aluminum composite material inside is exposed to a high-temperature environment for a long period. In this case, over-aging of the structural material lowers its mechanical strength with time. Therefore, the structural material may fall to the ground during storage or drop down during transportation 30 or 40 years later, for example. If such a situation occurs, the structural material can not suffer the impact and get damaged, resulting in a possible critical accident and the like. Accordingly, the container for use in storage or transportation of the spent nuclear fuel is required to use such a material that rarely varies its mechanical property and can retain original properties even under a high-temperature environment for a long time.

For the major purpose to provide a mechanical property that is not changed through a long-term use under a high-temperature environment, the aluminum composite material according to this embodiment includes a material composed of B or B-compound having a neutron absorbing power contained in a matrix of Al or Al-alloy. The material is sintered under pressure without artificially aging or by naturally aging (including T1 processing) the sintered material, or leave the sintered material in its extruded state. For instance, a billet sintered under pressure is extruded and then left in that extruded state or naturally aged to produce a square pipe for use in constructing the basket in the cask as disclosed below. In particular, the natural aging makes a hardly observable reduction in the mechanical strength even after the long-term exposure to the high-temperature environment while the original strength is low, because unlike artificial aging, the natural aging does not cause over-aging.

The mechanical strength may possibly be insufficient if the structural material is only naturally aged. To raise the base in the strength of the aluminum composite material, an additional element is contained to impart a property of high strength. This enables such a material to be realized for the first time, that has a sufficient mechanical strength and a hardly observable reduction in the mechanical strength even after the long-term exposure to the high-temperature environment. Such the aluminum composite material is extremely suitable for use in a structural material of a container for storage or transportation of the spent nuclear fuel.

The aluminum composite material was tested on its properties. In this test, certain test pieces were retained for 100 hours at 180° C., for 100 hours at 200° C. and for 100 hours at 350° C. to perform tensile tests on 0.2% durability (MPa), tensile strength (MPa) and shear stretch (%). The two formers were tested assuming the case immediately after accommodation of the spent nuclear fuel and the latter was tested assuming the case after 60-year accommodation of the spent nuclear fuel. As for the latter, a 60-year test can not be performed in practice. Instead, a test was performed at temperatures accelerated up to 350° C., which corresponds to a long-term retention of 60 years under a high-temperature environment of 200° C. As a result, in comparison of the case immediately after accommodation of the spent nuclear fuel to the case after 60-year accommodation, any variation was hardly observable in either of 0.2% durability (MPa), tensile strength (MPa) and shear stretch (%). Thus, it was found that the mechanical properties were unchanged.

In contrast, a T6-processed test piece and a test piece that has been T1-processed (naturally aged) or left in its extruded state after extruding were prepared and tested. As a result, it was determined that the T6-processed test piece was easily affected from a temperature elevation. This means that if the T6-processed composite material is employed in the long-term use under the high-temperature environment, the temperature elevation inside the container affects on the structural material and degrades the mechanical properties thereof.

If the aluminum composite material is not heated, it is difficult to obtain a fine crystal grain and accordingly improve the mechanical strength. The use of the aluminum composite material as a structural material, however, requires a mechanical strength to some extent. Therefore, the aluminum composite material of this embodiment contains an additional element for imparting high strength to compensate a lack in the mechanical strength. The additional element herein described is added to compensate a lack in the mechanical strength that is caused when no heating is performed. This has a different purpose from that of an element adding operation that is normally performed to pure aluminum.

Tensile tests were performed on the aluminum composite material that contains the additional element in the case of the use in a room-temperature environment and in the case corresponding to the 60-year use under the high-temperature environment (see the above description). As a result, improvements were observed in the 0.2% durability and the tensile strength while the shear stretch lowers slightly. The numeral values each hardly vary from the case corresponding to the 60-year storage, from which it was found that the mechanical properties could be maintained.

In consideration of the above, the aluminum composite material that is subjected to T1-processing (or natural aging that includes a certain use immediately after the extrusion that substantially effects as natural aging) is suitable for a structural material of a storage or transportation container. Because such the aluminum composite material has a mechanical property that is not degraded even if it is exposed under a long-term, high-temperature environment and also has a mechanical strength suitable for a structural material.

Examples of the aluminum composite material include aluminum in 6000 series. An aluminum-alloy in 6000 series is commonly known as a heated (T6-processed) alloy. Through natural aging by leaving the alloy in its extruded state after extruding, instead of positive heating, it can be employed as a structural material suitable for a storage or transportation container for the spent nuclear fuel. In addition, non-heated alloy (for example of 3000 or 5000 series) can also be similarly employed.

Figure 7:
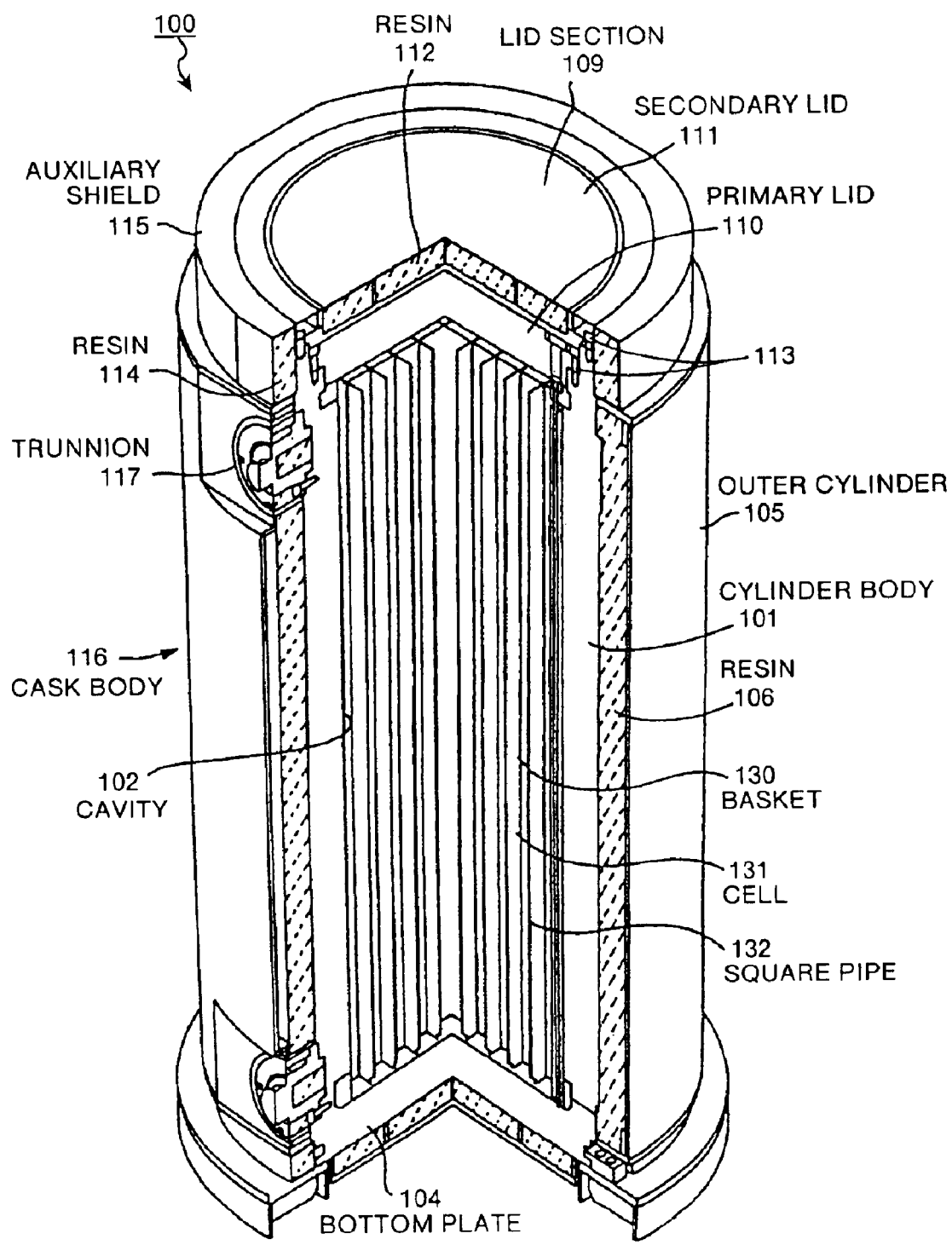
FIG. 7 is a perspective view which shows a cask.
Figure 8:
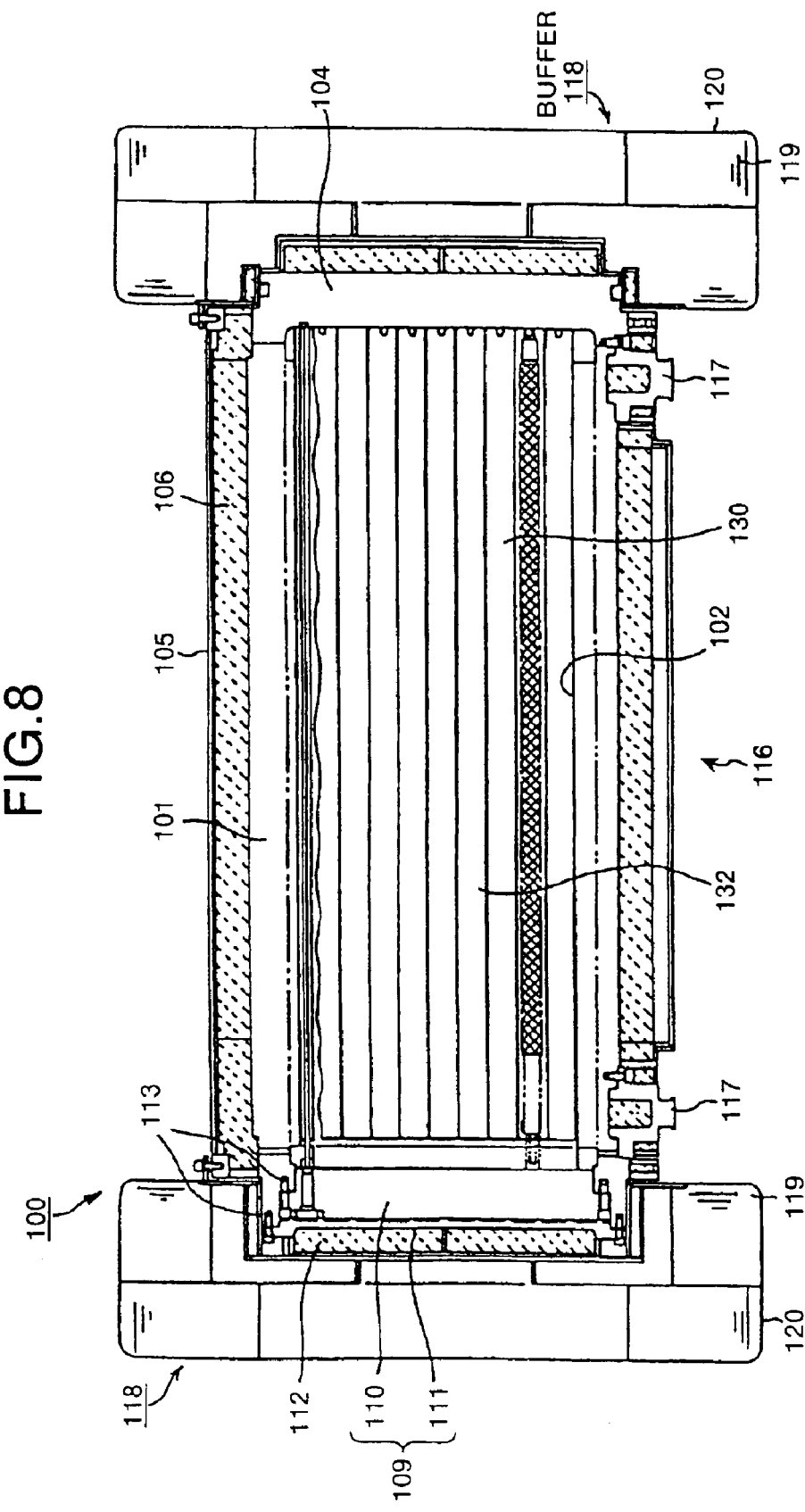
FIG. 8 is a radial cross-sectional view of the cask shown in FIG. 7.
Figure 9:
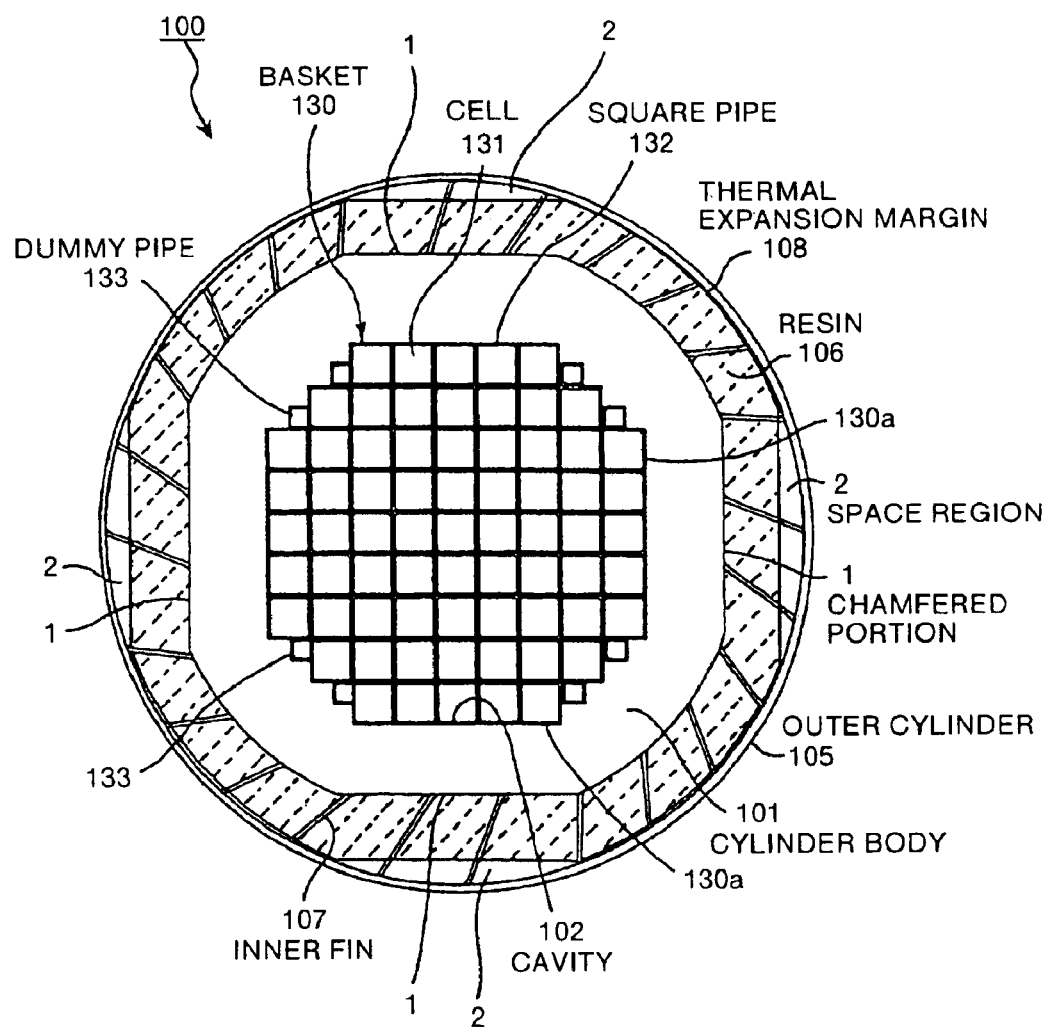
FIG. 9 is an axial cross-sectional view of the cask shown in FIG. 7.

A sixth embodiment will be explained below. In the sixth embodiment, the square pipe 1 can be employed in a specific use, which is exemplified next. FIG. 7 is a perspective view which shows a cask. FIG. 8 is a radial cross-sectional view of the cask shown in FIG. 7. FIG. 9 is an axial cross-sectional view of the cask shown in FIG. 7. This cask 100 comprises a cylinder body 101 having a cavity 102, of which inner surface is machined corresponding to the outer shape of a basket 130.

The cylinder body 101 and a bottom plate 104 are castings of carbon steel having a γ-ray shield function. Stainless steel may also be employed instead of carbon steel. The cylinder body 101 and the bottom plate 104 are coupled by welding. A metallic gasket is provided between a primary lid 110 and the cylinder body 101 to ensure the hermeticity as a pressure-proof container.

A resin 106 is filled between the cylinder body 101 and an outer cylinder 105. The resin is a polymeric material that contains a large amount of hydrogen and has a neutron shield function. A plurality of inner fins 107 composed of copper is welded for thermal conduction between the cylinder body 101 and the outer cylinder 105. The resin 106 is injected in a fluidized state into spaces formed by the inner fins 107, then cooled and solidified. Preferably, the inner fins 107 are located at a high density on parts with a large amount of heat to uniformly dissipate heat. A thermal expansion margin 108 of several mm is provided between the resin 106 and the outer cylinder 105.

A lid section 109 comprises the primary lid 110 and a secondary lid 111. The primary lid 110 is a disk composed of stainless steel or carbon steel that shields γ-ray. The secondary lid 111 is also a disk composed of stainless steel or carbon steel. A resin 112 is filled as a neutron shield over the upper surface of the secondary lid 111. The primary lid 110 and the secondary lid 111 are attached to the cylinder body 101 by a bolt 113 composed of stainless steel or carbon steel. Between the primary 110 and secondary 111 lids and the cylinder body 101, metallic gaskets are provided, respectively, to keep the inner hermeticity. An auxiliary shield 115 filled with a resin 114 is arranged around the lid section 109.

At both sides of a cask body 116, trunnions 117 are provided to suspend the cask 100. During transportation of the cask 100, the auxiliary shield 115 is removed and a buffer 118 is attached instead. The buffer 118 has such a structure that includes an outer cylinder 120 made of stainless steel and a buffering material 119 composed of redwood and the like incorporated i n the outer cylinder 120.

Figure 10:
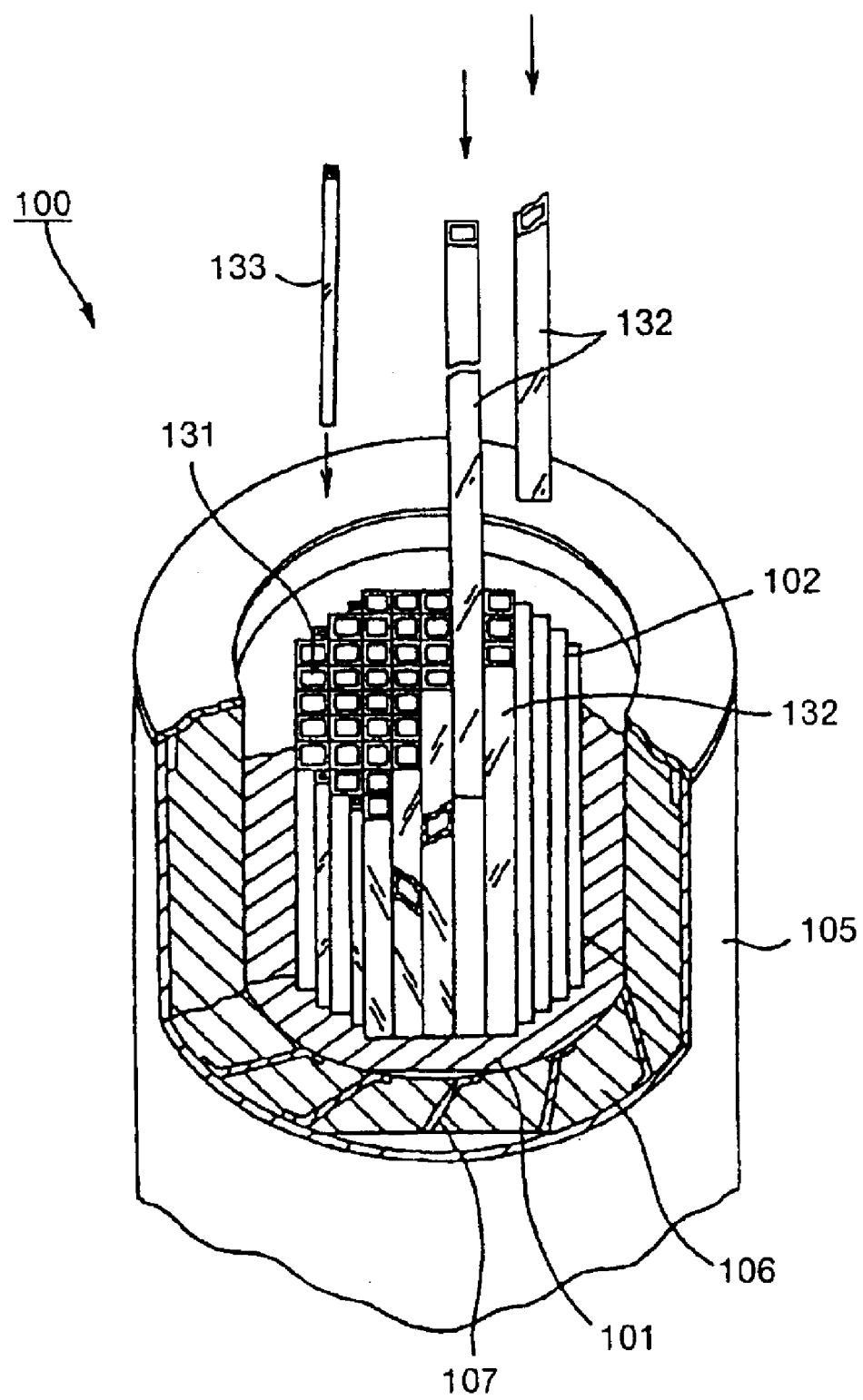
FIG. 10 is a perspective view which shows a method of inserting square pipes.

A basket 130 consists of 69 square pipes 1 that construct a cell 131 for accommodating an aggregate of spent nuclear fuel. The square pipes 1 employed are those manufactured by the manufacturing method according to the above embodiments. FIG. 10 shows a method of inserting the square pipes in a perspective view. The square pipes 1 manufactured by the above steps are inserted in turn along the machined shape inside the cavity 102.

As shown in FIGS. 10 and 8, at both sides of an array of square pipes in the cavity 102 where the number of cells is equal to 5 or 7, a dummy pipe 133 is inserted, respectively.

The dummy pipe 133 is employed for the purpose of reducing a weight of the cylinder body 101 and uniforming a thickness of the cylinder body 101 as well as ensuring steadiness of the square pipes 1. The above steps can be similarly applied to produce the dummy pipe 133 using a boron-doped aluminum alloy. The dummy pipe 133, however, can be omitted.

The spent nuclear fuel aggregate to be accommodated in the cask 100 contains fissionable substances and fission products and radiates radioactive rays along with decay heat. Therefore, the cask 100 is required to keep a heat removal function, a shield function and a criticality preventive function reliably during storage (about 60 years). In the cask 100 according to this embodiment, the cavity 102 in the cylinder body 101 is machined so that the basket 130 configured from the square pipes 1 can be inserted into the cavity 102, holding the outer side in a substantially intimate contact state (without any large gaps). In addition, the inner fins 107 are provided between the cylinder body 101 and the outer cylinder 105. Accordingly, heat from the fuel rods is conducted through the square pipes 1 or the filled helium gas to the cylinder body 101 and dissipated from the outer cylinder 105 mainly through the inner fins 107.

γ-ray radiated from the spent nuclear fuel aggregate can be shielded, for example, at the cylinder body 101, outer cylinder 105 and lid section 109 each composed of carbon steel or stainless steel. Neutrons can be shielded at the resin 106 to eliminate the exposure influencing on radioactive-related workers. Specifically, a shield function is designed to achieve a surface dose equivalent ratio of 2 mSv/h or less and a dose equivalent ratio of 100 $\mu$Sv/h or less at a depth of 1 m below the surface. As the boron-doped aluminum alloy is employed for the square pipes 1 to construct the cell 131, it is possible to absorb neutrons so as not to reach criticality.

The inside of the cavity 102 in the cylinder body 101 is machined such that the square pipes 1 for use in construction of the outer circumference of the basket 130 can be inserted into the cavity 102 in a substantially intimate contact state. Therefore, according to the cask 100, an area of the square pipe facing to the cavity can be widened and thermal conduction from the square pipe 1 can be improved. It is also possible to eliminate the space region in the cavity 102 and accordingly realize a compact and light cylinder body 101 if the number of the accommodated square pipes 1 is identical. In contrast, if the outer diameter of the cylinder body 101 is held unchanged, the number of cells can be ensured to the extent. Accordingly, it is possible to increase the number of the accommodated aggregates of the spent nuclear fuel. Specifically, the cask 100 is possible to accommodate the spent nuclear fuel as large as 69 aggregates while the cask body 116 is down-sized to have an outer diameter of 2560 mm and a weight of 120 tons.

In the sixth embodiment, the square pipes 1 are bundled to construct the basket 130. Alternatively, the square pipes 1 may be arranged in a stagger or checker pattern to construct the basket. Preferably, edges of the square pipes 1 are provided with securing structures for mating with each other.

In the cylinder body 101 the cask of the sixth embodiment includes a configuration for housing a canister in the form of a thin can (not depicted). The canister is employed to seal various radioactive substances such as the above spent nuclear fuel aggregates and nuclear wastes solidified in glass. The canister is accommodated in the cylinder body 101 and transported or managed per cask.

Figure 11:
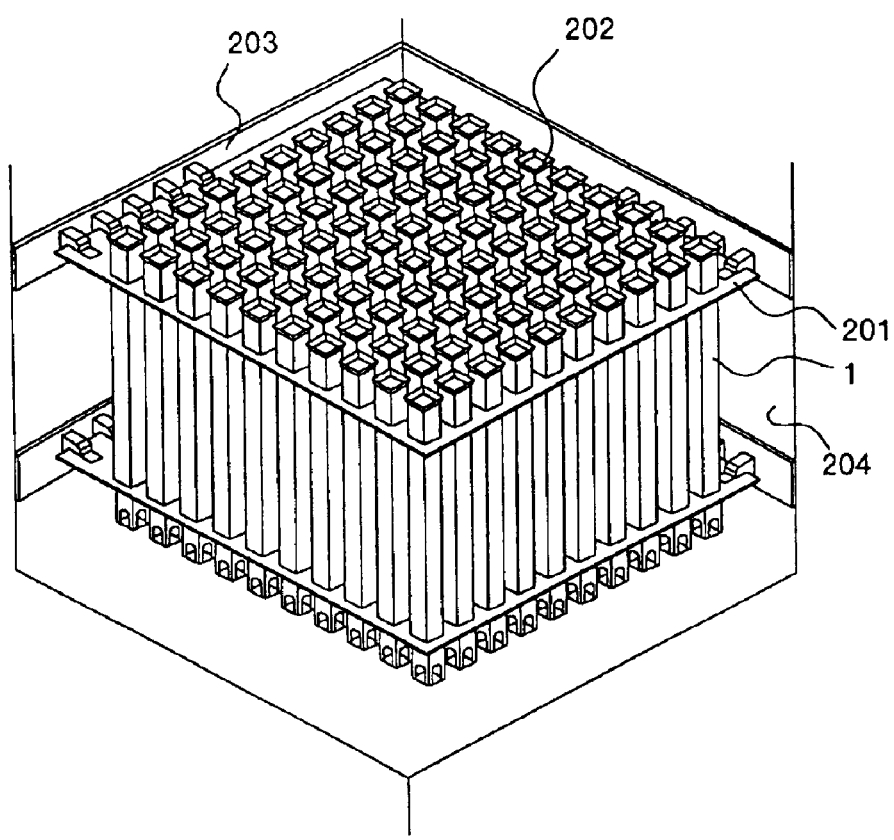
FIG. 11 is a perspective view which shows a spent fuel pool for PWR.

A seventh embodiment will be explained below. The seventh embodiment relates to another usage example of the square pipe. FIG. 11 shows a spent fuel pool for PWR in a perspective view. This spent fuel pool 200 comprises a rack 202, which includes a plurality of standing square pipes 1 manufactured by the manufacturing method according to Embodiment 1 or 2, and support plates 201 that support the upper and lower portions of the square pipes 1. The rack 202 is located inside a pit 203 composed of reinforced concrete. A lining 204 composed of stainless steel is stuck on the inner surface of the pit 203 to prevent the pit water from leaking.

The pit 203 is generally filled with an aqueous boric acid. The spent fuel pool 200, as it is configured with the use of the square pipes 1, has a high neutron absorbing power and can ensure the soundness of the structure. Therefore, it is possible to effectively prevent the spent nuclear fuel aggregate from reaching criticality. Replacement of square pipes of B-SUS with those of B—Al leads to a greatly reduced, abnormal load in the fuel pool and to an improved security in the storage facility.

In the case of the use as the rack 202 in the fuel pool, the B-SUS square pipe currently employed has a pH of about 3.0 while the B—Al square pipe 1 has a pH of about 4.5. The aqueous boric acid is acidic and thus causes crevice corrosion possibly. Therefore, it is preferable to make an aqueous environment in the fuel pool milder.

As described above, the method of manufacturing a radioactive-substance storage member according to the present invention includes the steps of, mixing an aluminum powder with a neutron absorber powder, pressing the mixed powder to form a preliminary molding, and sintering the preliminary molding under no pressure in vacuum or in an inert gas ambience. This method is effective to simplify the manufacture of the radioactive-substance storage member.

The method of manufacturing a radioactive-substance storage member according to the present invention also includes the steps of, mixing an aluminum powder with a neutron absorber powder, pressing the mixed powder to form a preliminary molding, sintering the preliminary molding under no pressure in vacuum or in an inert gas ambience to form a billet, heating the billet using an induction heating unit, and extruding the induction-heated billet using dies to form a square pipe or plate for configuring a basket for accommodating an aggregate of spent fuel or a rod to be inserted in a guide pipe for spent fuel. In the square pipe for accommodating an aggregate of spent fuel, the square pipe is formed by mixing an aluminum powder with a neutron absorber powder through cold isostatic press or cold unidirectional press to form a preliminary molding, vacuum sintering the preliminary molding under no pressure to form a billet, and heating the billet using an induction heating unit to extrude the square pipe. This is effective to achieve efficient induction heating, a simplified manufacturing process and an efficient extrusion of billets.

The method of manufacturing a radioactive-substance storage member according to the present invention further includes the steps of, mixing an aluminum powder with a neutron absorber powder, pressing the mixed powder through cold isostatic press or cold unidirectional press to form a preliminary molding, sintering the preliminary molding under no pressure in vacuum to form a billet, and extruding the billet using the heat during the sintering to form a square pipe or plate for configuring a basket for accommodating an aggregate of spent fuel or a rod to be inserted in a guide pipe for spent fuel. This is effective to eliminate the need for re-heating of the billet and simplifies the manufacturing process. In the method of manufacturing a radioactive-substance storage member according to the present invention, the preliminary molding may be determined to have a weight density of more than 75% and less than 95% to perform sound extrusion.

In the method of manufacturing a radioactive-substance storage member according to the present invention, mechanical alloying may be employed to mix the aluminum powder with the neutron absorber powder. This allows the neutron absorber powder in a fine state to be uniformly dispersed in the aluminum matrix, resulting in an improved mechanical strength of the storage member for the spent nuclear fuel.

The method of manufacturing a radioactive-substance storage member according to the present invention, a ball used in ball milling has a major constituent identical to an element that is expected to add. Therefore, the additional element can be added to a sample during the ball milling. This is effective to simplify the manufacturing process.

The method of manufacturing a radioactive-substance storage member according to the present invention, further includes, after the extruding, the step of naturally aging the square pipe or plate for configuring a basket for accommodating an aggregate of spent fuel or the rod to be inserted in a guide pipe for spent fuel. This is effective to obtain a suitable radioactive-substance storage member.

The billet for use in extrusion of a radioactive-substance storage member according to the present invention comprises a mixed powder of an aluminum powder and a neutron absorber powder. The mixed powder is molded to have a weight density ranging from 75% to 95% and sintered to fuse each powdery particle to another. This allows the billet to be inductively heated easily and simplifies the manufacturing process of the radioactive-substance storage member.

The billet for use in extrusion of a radioactive-substance storage member according to the present invention comprises a mixed powder of an aluminum powder flattened by mechanical alloying and a pulverized boron or boron-compound folded and dispersed into the aluminum powder. The mixed powder is molded to have a weight density ranging from 75% to 95% and sintered to fuse each powdery particle to another. This is effective to prevent aggregation during sintering. The radioactive-substance storage member extruded using the billet has uniform components and improved the mechanical strength.

The billet for use in extrusion of a radioactive-substance storage member according to the present invention is employed as a structural material of storage or transportation containers for spent nuclear fuel. The aluminum powder contains an additive element such as Zr for imparting high strength to improve the mechanical strength.

The method of manufacturing a radioactive-substance storage member for use in storage of a radioactive substance according to the present invention comprises the steps of mixing an aluminum powder with a neutron absorber powder, pressing the mixed powder to form a preliminary molding, sintering the preliminary molding with a vacuum hot press to form a billet, heating the billet using an induction heating unit, and extruding the induction-heated billet using dies to form a square pipe or plate which configures a basket for accommodating an aggregate of spent fuel or a rod to be inserted in a guide pipe for spent fuel. As a result, the manufacturing process of the radioactive-substance storage member can be simplified, and the billet can be extruded efficiently.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of manufacturing a radioactive-substance storage member for use in storage of a radioactive substance, the method comprising steps of:
   mixing an aluminum powder with a neutron absorber powder;
   pressing the mixed powder to form a preliminary molding;
   sintering the preliminary molding under no pressure in an ambience that can prevent the preliminary molding from oxidizing;
   extruding the preliminary molding to form a square pipe or plate; and
   leaving the square pipe or plate in that extruded state or naturally aging the square pipe or plate so that the square pipe or plate is stable at a high temperature over a long period of time, wherein the square pipe or plate configures a basket for accommodating an aggregate of spent fuel or a rod to be inserted in a guide pipe for spent fuel.

2. The method according to claim 1, wherein the preliminary molding has a weight density of more than 75% and less than 95%.

3. The method according to claim 1, wherein the mixing includes mechanical alloying.

4. The method according to claim 3, wherein the mechanical alloying includes ball milling, the ball milling using a bail having a major constituent identical to an element previously added to a sample in order to add the element from the ball into the aluminum matrix by the wearing of the ball during the ball milling.

5. A method of manufacturing a radioactive-substance storage member for use in storage of a radioactive substance, the method comprising steps of:
   mixing an aluminum powder with a neutron absorber powder;
   pressing the mixed powder to form a preliminary molding;
   sintering the preliminary molding under no pressure in vacuum to form a billet by elevating a sintering temperature step by step;
   heating the billet using an induction heating unit;
   extruding the induction-heated billet having a weight density of 75% to 95% using dies to form a square pipe or plate;
   performing a tensile reformation;
   cutting away unsteady parts and evaluation parts; and
   configuring a basket for accommodating an aggregate of spent fuel or a rod to be inserted in a guide pipe for spent fuel.

6. The method according to claim 5, wherein the preliminary molding has a weight density of more than 75% and less than 95%.

7. The method according to claim 5, wherein the mixing includes mechanical alloying.

8. The method according to claim 7, wherein the mechanical alloying includes ball milling, the ball milling using a ball having a major constituent identical to an element previously added to a sample in order to add the element from the ball into the aluminum matrix by the wearing of the ball during the ball milling.

9. The method according to claim 5, further comprising, after the extruding, leaving the square pipe or plate in that extruded state or naturally aging the square pipe or plate, the square pipe of plate which configures a basket for accommodating an aggregate of spent fuel or the rod to be inserted in a guide pipe for spent fuel.

10. A method of manufacturing a radioactive-substance storage member for use in storage of a radioactive substance, the method comprising steps of:
    mixing an aluminum powder with a neutron absorber powder;
    pressing the mixed powder to form a preliminary molding;
    sintering the preliminary molding under no pressure in vacuum to form a billet by elevating a sintering temperature step by step;
    extruding the billet having a weight density of 75% to 95% using the heat during the sintering to form a square pipe or plate;
    performing a tensile reformation;
    cutting away unsteady parts and evaluation parts; and
    configuring a basket for accommodating an aggregate of spent fuel or a rod to be inserted in a guide pipe for spent fuel.

11. The method according to claim 10, wherein the preliminary molding has a weight density of more than 75% and less than 95%.

12. The method according to claim 10, wherein the mixing includes mechanical alloying.

13. The method according to claim 12, wherein the mechanical alloying includes ball milling, the ball milling using a ball having a major constituent identical to an element previously added to a sample in order to add the element from the ball into the aluminum matrix by the wearing of the ball during the ball milling.

14. The method according to claim 10, further comprising, after the extruding, leaving the square pipe or plate in that extruded state or naturally aging the square pipe or plate, the square pipe of plate which configures a basket for accommodating an aggregate of spent fuel or the rod to be inserted in a guide pipe for spent fuel.

* * * * *